United States Patent [19]
Urakami

[11] Patent Number: 5,592,998
[45] Date of Patent: Jan. 14, 1997

[54] DEVICE CAPABLE OF SUCTION-ADHERING TO A SURFACE AND MOVING THEREALONG

[75] Inventor: Fukashi Urakami, Yokohama, Japan

[73] Assignees: Urakami Research and Development, Kangawa; Honda Giken Kogyo Kabushiki Kaishi, Tokyo, both of Japan

[21] Appl. No.: 356,228
[22] PCT Filed: Apr. 27, 1994
[86] PCT No.: PCT/JP94/00701
    § 371 Date: Dec. 19, 1994
    § 102(e) Date: Dec. 19, 1994
[87] PCT Pub. No.: WO94/25328
    PCT Pub. Date: Nov. 10, 1994

[30] Foreign Application Priority Data
May 4, 1993 [JP] Japan ................................. 5-138847

[51] Int. Cl.⁶ .......................... B60B 39/00; B62D 57/024
[52] U.S. Cl. ............................ 180/164; 180/8.1; 180/8.5; 180/8.6; 180/901
[58] Field of Search ..................................... 180/901, 164, 180/8.5, 8.6, 8.1, 8.3; 248/362, 363

[56] References Cited

U.S. PATENT DOCUMENTS

| | | | |
|---|---|---|---|
| 4,095,378 | 6/1978 | Urakami | 51/425 |
| 4,926,957 | 5/1990 | Urakami | 180/164 |
| 4,934,475 | 6/1990 | Urakami | 180/164 |
| 5,007,210 | 4/1991 | Urakami | 180/164 |
| 5,014,803 | 5/1991 | Urakami | 180/164 |
| 5,161,631 | 11/1992 | Urakami | 180/164 |

FOREIGN PATENT DOCUMENTS

0430161  6/1991  European Pat. Off. .

Primary Examiner—Brian L. Johnson
Assistant Examiner—Victor E. Johnson
Attorney, Agent, or Firm—Beveridge, Degrandi, Weilacher and Young, L.L.P.

[57] ABSTRACT

A device capable of suction-adhering to a surface and moving therealong includes a pressure receiver, a partitioning device mounted on the pressure receiver and defining a pressure reduction space in cooperation with the pressure receiver and the surface, and a pressure reducing device for discharging a fluid from the pressure reduction space to decrease the pressure inside the pressure reduction space. The partitioning device includes a lip portion extending along the surface. A plurality of contacting devices are disposed at intervals at the part other than the outer peripheral edge portion in that opposing face of the lip portion of the partitioning device which is located opposite to the surface. The outer peripheral edge portion in the opposing face of the lip portion is brought into contact with the surface. At the same time, at the part other than the outer peripheral edge portion in the opposing face of the lip portion, the contacting devices are brought into contact with the surface. A gap communicating with the pressure reduction space is retained between the surface and the part other than the outer peripheral edge portion in the opposing face of the lip portion.

8 Claims, 10 Drawing Sheets

DEVICE CAPABLE OF SUCTION-ADHERING TO A SURFACE AND MOVING THEREALONG

TECHNICAL FIELD

This invention relates to a device which can adhere by suction to a surface of a ship, an oil reservoir tank or a building, and move along the surface, thereby to perform work such as cleaning, painting or testing.

BACKGROUND ART

Typical examples of a device which can suction-adhere to a vertical or inclined surface and move along it are those disclosed in the specification and drawings each of U.S. Pat. Nos. 4,095,378, 4,926,957 and 4,934,475.

Such a device has a pressure receiver, a partitioning means mounted on the pressure receiver and defining a pressure reduction space in cooperation with the pressure receiver and a surface, and a pressure reducing means for discharging a fluid from the pressure reduction space to decrease the pressure inside the pressure reduction space. The partitioning means is constructed such that its part to be contacted with the surface is displaceable by a relatively small force toward and away from the surface.

FIG. 5-C of U.S. Pat. No. 4,926,957 discloses a partitioning means of a structure comprising a lip portion allowed to extend along a surface, an extension further extending obliquely from a front end of the lip portion in a direction away from the surface, and an inside connecting portion and an outside connecting portion connecting the inner peripheral edge portion of the lip portion to a pressure receiver, the lip portion, extension and both connecting portions being integrally formed a flexible material such as synthetic rubber. In such a partitioning means, the lip portion is brought into contact with the surface, and it is moved toward and away from the surface by the elastic deformation of the inside connecting portion and the outside connecting portion. If a bulge such as a weld line is present on the surface, the extension and the lip portion ride over the bulge under the guiding action of the extension. Thus, the partitioning means can pass over the bulge smoothly and move, without posing a problem such as the inward folding of the lip portion.

The above-mentioned partitioning means of a structure including a lip portion allowed to extend along a surface has been demonstrated to surpass a partitioning means of other structures in terms of various properties including the bulge-passing properties. However, the conventional partitioning means including a lip portion which is allowed to extend along a surface includes problems to be solved. For instance, if the surface to which the device is caused to suction-adhere is a curved surface having a relatively small radius of curvature, there is a tendency that the lip portion of the partitioning means is not bent along the curved surface owing to the rigidity possessed by the lip portion, and thus the lip portion is gradually separated from the surface, beginning with its outer peripheral edge portion. If such a tendency is augmented, the inner peripheral edge portion of the lip portion is also released from the surface. As a result, the pressure reduction space may become open, destroying the suction-adhesion of the device to the surface.

DISCLOSURE OF THE INVENTION

A principal object of the present invention is, therefore, to provide a device capable of suction-adhering to a surface and moving therealong, in which a partitioning means including a lip portion allowed to extend along the surface is improved such that even if the surface is a curved surface having a relatively small radius of curvature, the lip portion is allowed to extend along the surface fully stably without being separated from the surface, whereby an intimate contact is maintained between the lip portion and the surface.

To attain this object, the present invention is constructed such that a plurality of contacting means are disposed at intervals at a part other than an outer peripheral edge portion in that opposing face of the lip portion of the partitioning means which is located opposite to the surface; at the part other than the outer peripheral edge portion in the opposing face of the lip portion, the contacting means are brought into contact with the surface; and a gap communicating with the pressure reduction space is retained between the surface and the part other than the outer peripheral edge portion in the opposing face of the lip portion.

That is, in order to achieve the above object, the present invention provides a device capable of suction-adhering to a surface and moving therealong, which comprises a pressure receiver, a partitioning means mounted on the pressure receiver and defining a pressure reduction space in cooperation with the pressure receiver and the surface, and a pressure reducing means for discharging a fluid from the pressure reduction space to decrease the pressure inside the pressure reduction space, the partitioning means including a lip portion allowed to extend along the surface, and the partitioning means being constructed such that the lip portion is displaceable by a relatively small force toward and away from the surface, wherein:

a plurality of contacting means are disposed at intervals at a part other than an outer peripheral edge portion in that opposing face of the lip portion of the partitioning means which is located opposite to the surface; the outer peripheral edge portion in the opposing face of the lip portion is brought into contact with the surface, while at the part other than the outer peripheral edge portion in the opposing face of the lip portion, the contacting means are brought into contact with the surface; and a gap communicating with the pressure reduction space is retained between the surface and the part other than the outer peripheral edge portion in the opposing face of the lip portion.

The outer peripheral edge portion and the front end of the contacting means in the opposing face of the lip portion of the partitioning means are preferably on substantially the same plane. Preferably, the lip portion of the partitioning means is annular in shape, and each of the contacting means is composed of a ridge extending radially over the part other than the outer peripheral edge portion in the opposing face of the lip portion. Alternatively, each of the contacting means may be composed of a columnar projection, or of a brush embedded in the part other than the outer peripheral edge portion in the opposing face of the lip portion. Advantageously, the partitioning means includes an extension further extending obliquely from the front end of the lip portion in a direction away from the surface, and an inside connecting portion and an outside connecting portion connecting the inner peripheral edge portion of the lip portion to the pressure receiver; the lip portion, the extension and the inside and outside connecting portions are integrally formed of a flexible material; and the lip portion is displaced toward and away from the surface by the elastic deformation of the inside connecting portion and the outside connection portion.

In the device improved by the present invention, a gap communicating with the pressure reduction space is retained between the part other than the outer peripheral edge portion in the opposing face of the lip portion of the partitioning means and the surface to which the device is caused to suction-adhere. Therefore, at the part other than the outer peripheral edge portion in the outside surface of the lip portion (the surface exposed to the outside), a force pressing the part other than the outer peripheral edge portion of the lip portion against the surface acts owing to the difference in pressure between the inside and the outside of the gap. Such a force reliably prevents the lip portion of the partitioning means from being separated from the surface. Consequently, the lip portion is allowed to extend along the surface fully stably, whereby an intimate contact is maintained between the lip portion and the surface.

BEST MODE FOR CARRYING OUT THE INVENTION

Preferred embodiments of the device constructed in accordance with the present invention will be described in greater detail with reference to the accompanying drawings.

Figure 1:
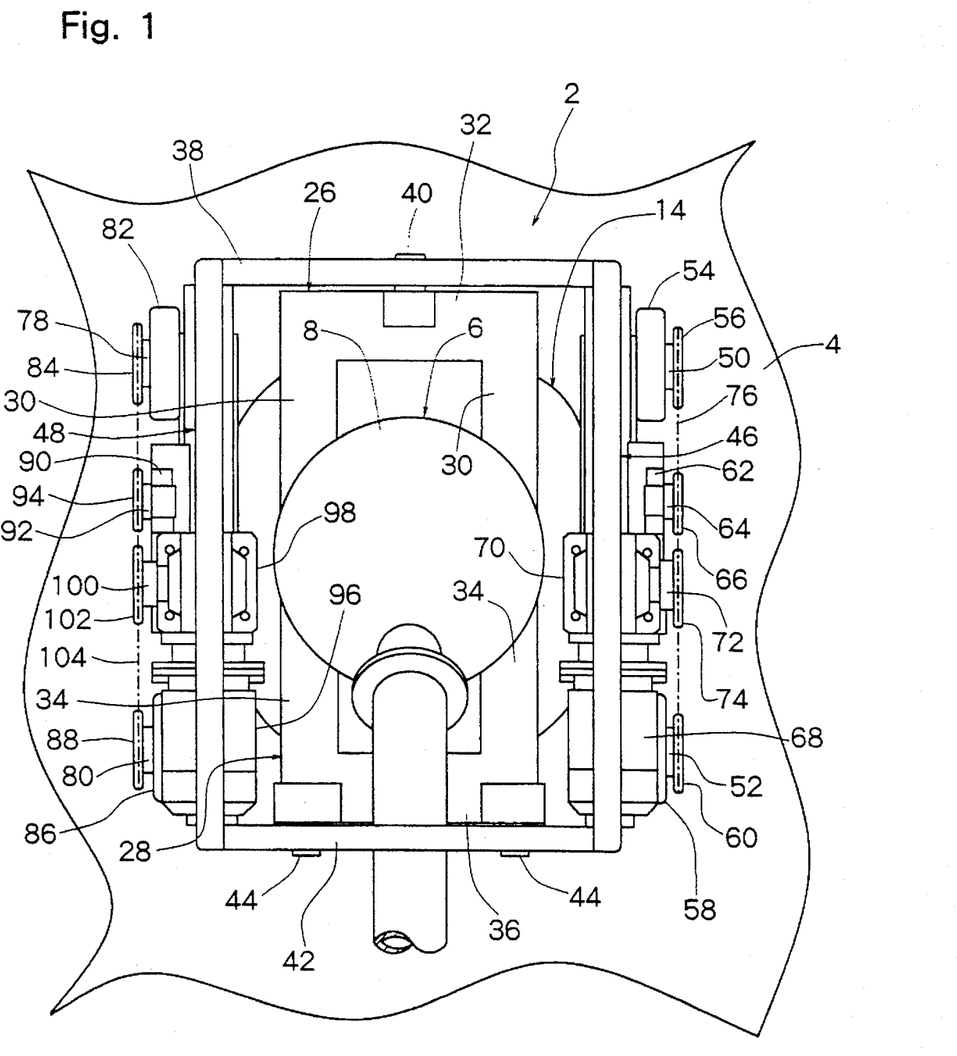
FIG. 1 is a front view showing a state in which a preferred embodiment of the device constructed in accordance with the present invention is caused to suction-adhere to a vertical surface.
Figure 2:
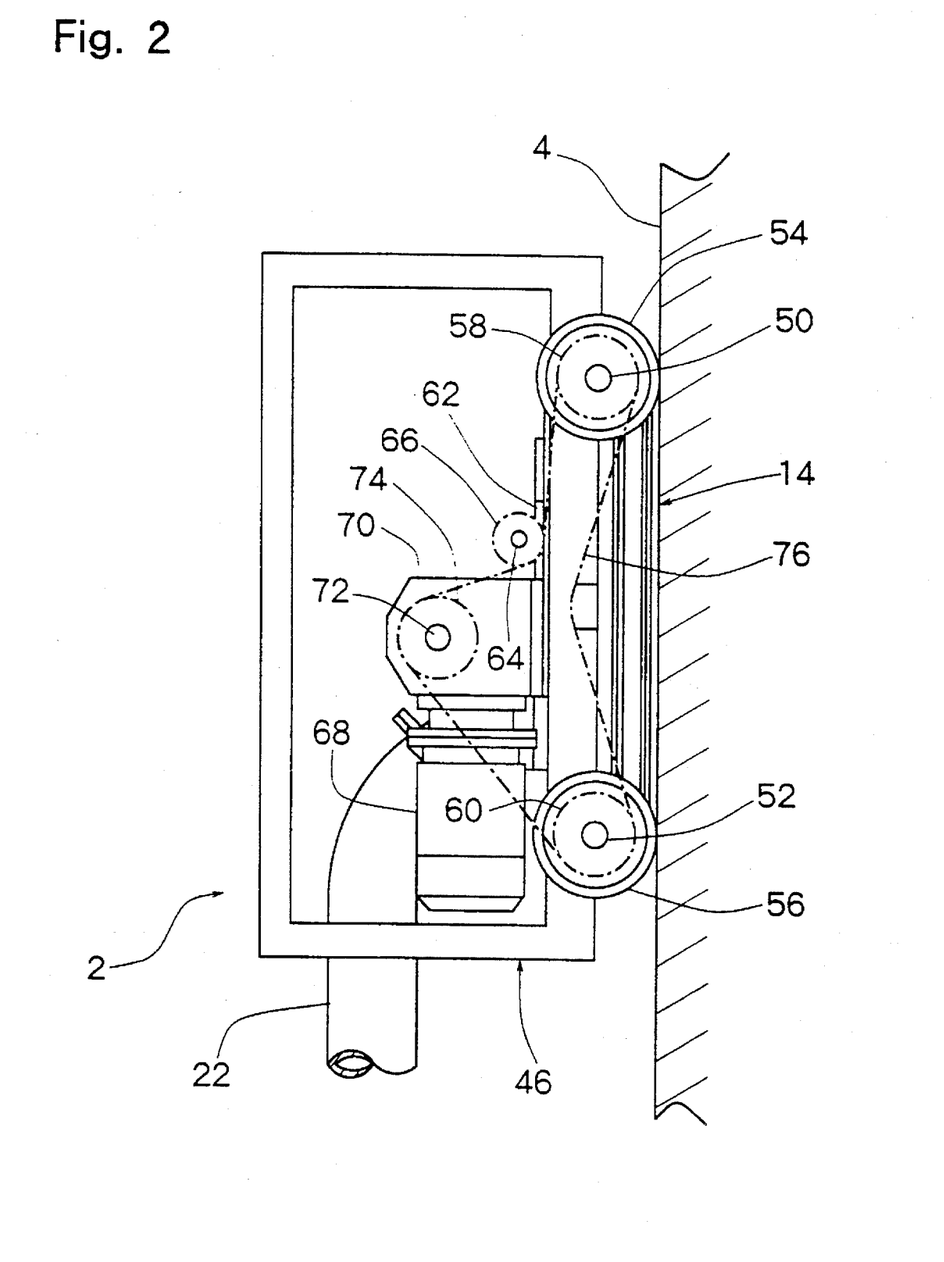
FIG. 2 is a side view of the device illustrated in FIG. 1.
Figure 3:
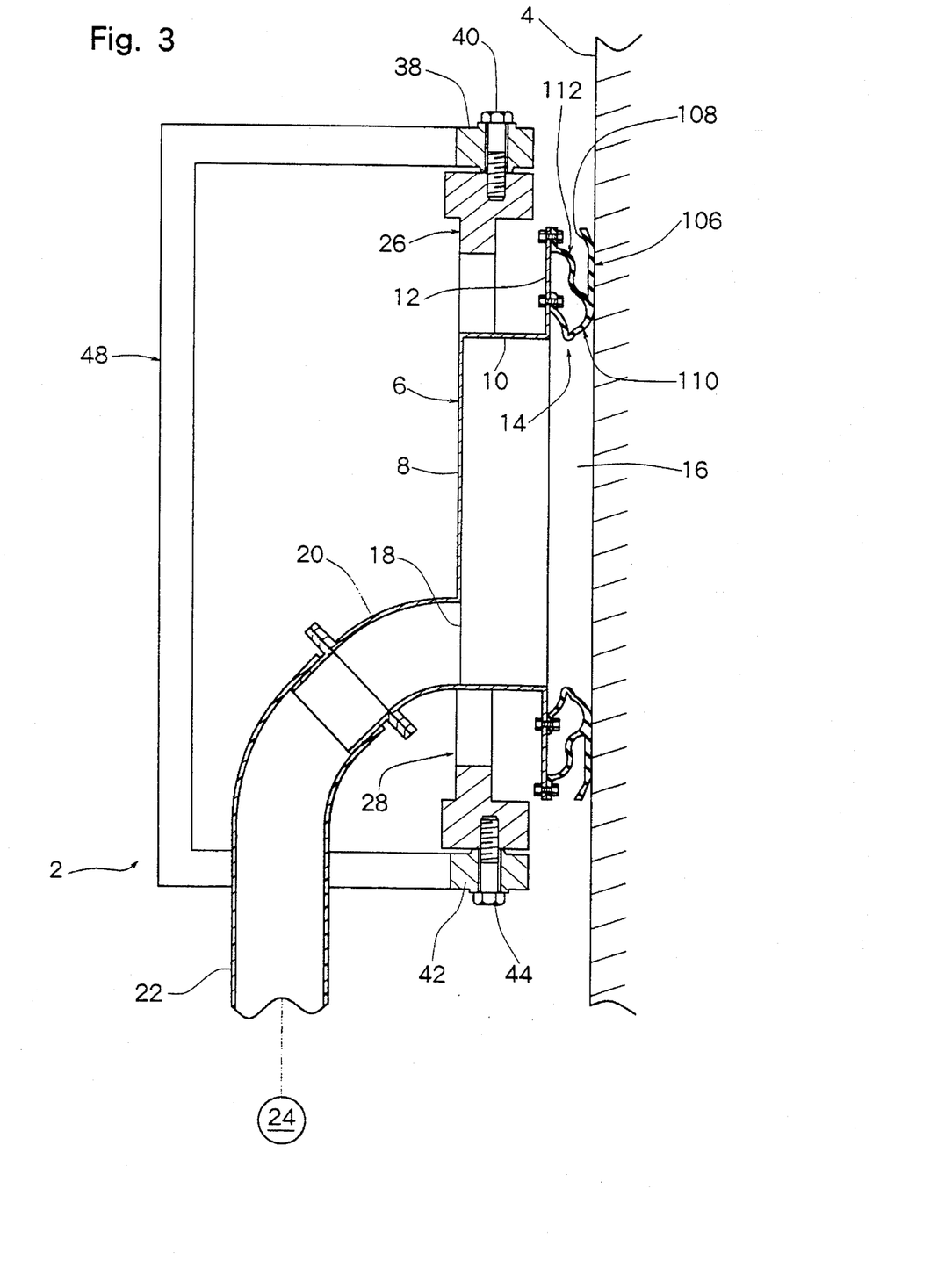
FIG. 3 is a sectional view of the device illustrated in FIG. 1.
Figure 4:
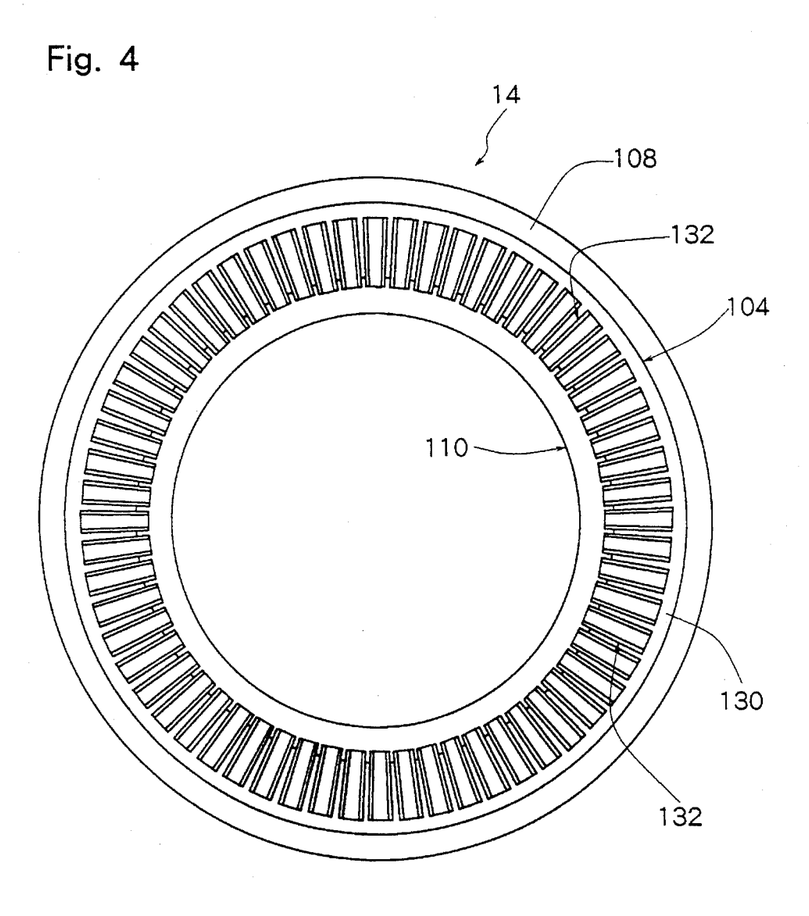
FIG. 4 is a bottom view showing the partitioning means used in the device of FIG. 1.
Figure 5:
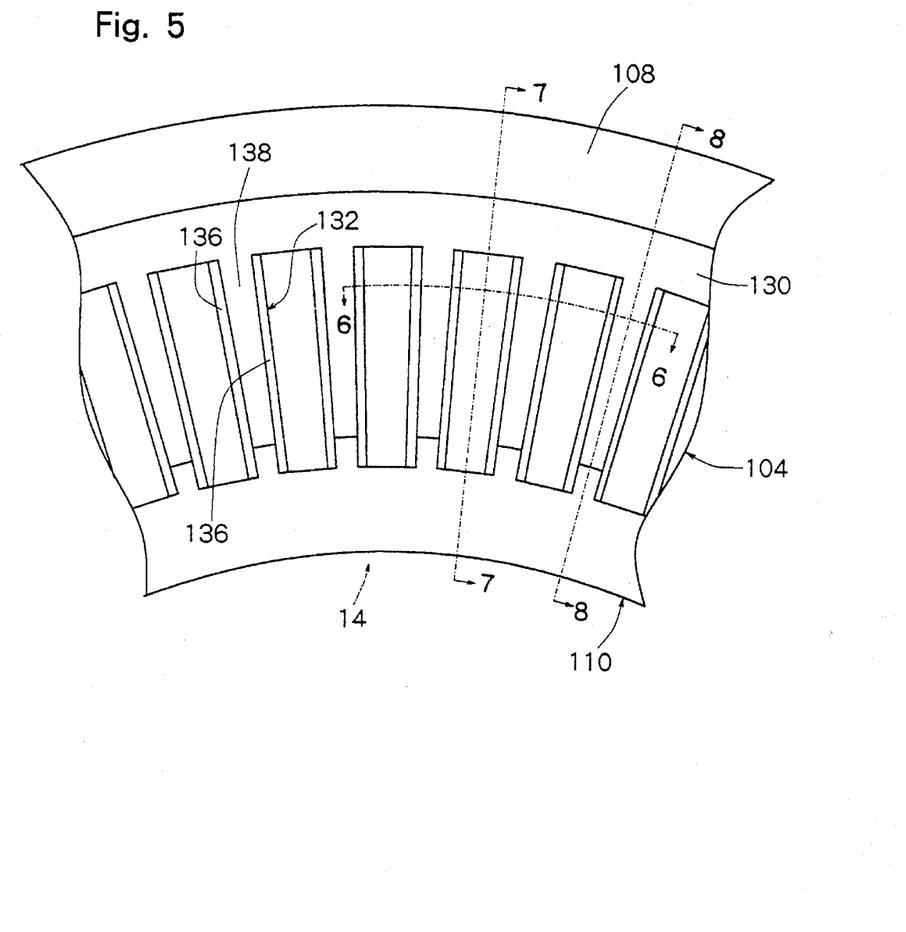
FIG. 5 is a partial bottom view, partly enlarged, of the partitioning means illustrated in FIG. 4.
Figure 6:
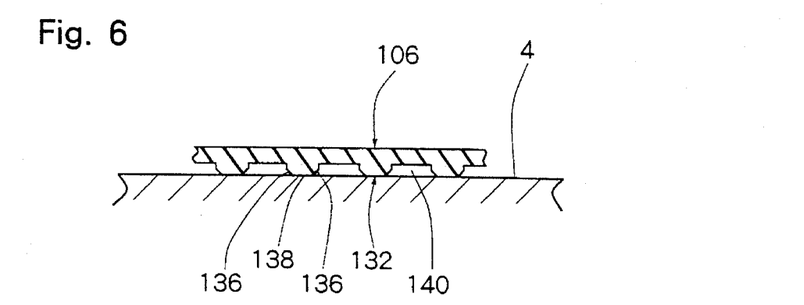
FIG. 6 is a sectional view taken on line 6—6 of FIG. 5.

FIGS. 1 to 3 show a state in which the device constructed in accordance with the present invention, indicated entirely at 2, is caused to suction-adhere to a surface 4 which extends substantially vertically. With reference to FIGS. 1 to 3, especially FIG. 3, the device 2 has a pressure receiver 6 formed of a rigid material which is advantageously a suitable metal plate such as a stainless steel plate. The pressure receiver 6 has a circular top wall 8, a cylindrical side wall 10 extending from the peripheral edge of the top wall 8, and an annular flange wall 12 extending from the front end of the side wall 10. A partitioning means 14 is mounted on the flange wall 12 of the pressure receiver 6. As will be easily understood by reference to FIG. 3, the partitioning means 14 is brought into contact with the surface 4, and a substantially fluid-tight pressure reduction space 16 is defined by the pressure receiver 6, the partitioning means 14, and the surface 4. The structure of the partitioning means 14 itself will be described in detail later. In the top wall 8 of the pressure receiver 6 is formed an opening 18, which is connected to an arcuate connecting pipe 20. The connecting pipe 20 is connected to a pressure reducing means 24 via a flexible hose 22. When the device 2 is to be used in the air, the pressure reducing means 24 may be comprised of a suitable evacuating means such as a vacuum pump or an ejector. When the device 2 is to be used in a liquid such as water, the pressure reducing means 24 may be composed of a drainage pump.

Further with reference to FIGS. 1 to 3, the side wall 10 of the pressure receiver 6 has fixed thereto a connecting frame 26 located above the side wall 10 in FIG. 1, and a connecting frame 28 located below the side wall 10 in FIG. 1. The connecting frame 26 has extensions 30 extending upward from the side wall 10 of the pressure receiver 6 at a distance in the right-and-left direction in FIG. 1, and a mounting portion 32 extending between the upper ends of the extensions 30. The connecting frame 28 has extensions 34 extending downward from the side wall 10 of the pressure receiver 6 at a distance in the right-and-left direction in FIG. 1, and a mounting portion 36 extending between the lower ends of the extensions 34. As illustrated clearly in FIGS. 1 and 3, a transverse frame 38 is secured by a fastening bolt 40 to the upper surface, as viewed in FIG. 1, of the mounting portion 32 of the connecting frame 26. Likewise, a transverse frame 42 is secured by fastening bolts 44 to the lower surface, as viewed in FIG. 1, of the mounting portion 36 of the connecting frame 28. A traveling frame 46 is fixed between one end of the transverse frame 38 (the right end in FIG. 1) and one end of the transverse frame 42 (the right end in FIG. 1), while a traveling frame 48 is fixed between the other end of the transverse frame 38 (the left end in FIG. 1) and the other end of the transverse frame 42 (the left end in FIG. 1). The traveling frames 46 and 48 are each nearly rectangular in shape, and the upper end and the lower end of their base portion extending in the up-and-down direction on the right-hand side in FIGS. 2 and 3 are secured, respectively, to the one end each of the transverse frames 38 and 42 and the other end each of the transverse frames 38 and 42. The above-mentioned connecting frames 26 and 28, the transverse frames 38 and 42, and the traveling frames 46 and 48 may be formed of a suitable metal material such as a section steel.

By reference to FIGS. 1 and 2, a pair of axles 50 and 52 are rotatably mounted on the base portion of the traveling frame 46 at a distance in the up-and-down direction in FIGS. 1 and 2. A wheel 54 and a sprocket 56 are fixed to the axle 50, while a wheel 58 and a sprocket 60 are fixed to the axle 52. To the traveling frame 46 is mounted a bracket 62, a short axle 64 is rotatably mounted on the bracket 62, and a tension sprocket 66 is fixed to the short axle 64. The bracket 62 is mounted on the traveling frame 46 so as to be movable over some range in the right-and-left direction in FIG. 2, and is resiliently urged rightward in FIG. 2 by means of a suitable spring member (not shown) interposed between the traveling frame 46 and the bracket 62. To the traveling frame 46 are further mounted a rotary drive source 68 and a reduction gear mechanism 70. The output shaft of the rotary drive source 68, which may be an electric motor, is connected to the input shaft of the reduction gear mechanism 70, and a sprocket 74 is fixed to the output shaft 72 of the reduction gear mechanism 70. As clearly illustrated in FIG. 2, an endless chain 76 is wound over the sprockets 56, 60, 66 and 74. Thus, when the rotary drive source 68 is energized, the wheels 54 and 58 are rotationally driven. As in the case of the traveling frame 46, a pair of axles 78 and 80 are rotatably mounted on the traveling frame 48 in a similar manner. A wheel 82 and a sprocket 84 are fixed to the axle 78, while a wheel 86 and a sprocket 88 are fixed to the axle 80. To the traveling frame 48 is mounted a bracket 90, a short axle 92 is rotatably mounted on the bracket 90, and a tension sprocket 94 is fixed to the short axle 92. The bracket 90 is mounted on the traveling frame 48 so as to be movable over some range in the right-and-left direction in FIG. 2, and is resiliently urged rightward in FIG. 2 by means of a suitable spring member (not shown) interposed between the traveling frame 48 and the bracket 90. To the traveling frame 48 are further mounted a rotary drive source 96 and a reduction gear mechanism 98. The output shaft of the rotary drive source 96, which may be an electric motor, is connected to the input shaft of the reduction gear mechanism 98, and a sprocket 102 is fixed to the output shaft 100 of the reduction gear mechanism 98. An endless chain 104 is wound over the sprockets 84, 88, 94 and 102. Thus, when the rotary drive source 96 is energized, the wheels 82 and 86 are rotationally driven. The wheels 54, 58, 82 and 86 constituting a driven traveling means may be formed of a suitable synthetic resin. If desired, instead of the wheels 54, 58, 82 and 86, there may be employed another suitable traveling element such as an endless track. Furthermore, the device 2 may be moved by other suitable means such as a vibration generating means as disclosed in the specification and drawings of U.S. Pat. No. 4,934,475.

The above-described structure other than the partitioning means 14 in the illustrated device 2 does not involve the novel improvement incorporated in the device according to the present invention, but may be the same as the structure of the device disclosed in the specification and drawings of the aforementioned U.S. Pat. Nos. 4,095,378 or 4,926,957. Therefore, the descriptions in the specifications and drawings of these U.S. patents will be quoted in the present specification, and the detailed explanation for the structure other than the partitioning means 14 in the illustrated device 2 will be omitted in the present specification.

In referring to FIGS. 4 to 8, the partitioning means 14 in the illustrated device 2 is integrally formed of a flexible material, and has an extension 108, an inside connecting portion 110, and an outside connecting portion 112 as well as a lip portion 106. An example of a suitable material for forming the partitioning means is synthetic rubber such as urethane rubber. The annular shaped lip portion 106 is allowed to extend substantially parallel to the flange wall 12 in the pressure receiver 6 (accordingly, when the surface 4 to which the device 2 is caused to suction-adhere is substantially flat, the lip portion 106 extends substantially in a planar form along the surface 4). The extension 108 extending from the forward end of the lip portion 106 is allowed to extend obliquely in a direction away from the surface. The inside connecting portion 110 that connects the inner peripheral edge portion of the lip portion 106 to the flange wall 12 of the pressure receiver 6 has a deflecting portion 114 which, in the cross-sectional view, extends nearly arcuately from the inner peripheral edge portion of the lip portion 106 in a radially inward direction and then extends nearly arcuately in a radially outward direction, and a flange portion 116 which further extends substantially linearly from the deflecting portion 114 along the flange wall 12 of the pressure receiver 6 in a radially outward direction. The outside connecting portion 112 that radially outwardly of the inside connecting portion 110 connects the inner peripheral edge portion of the lip portion 106 to the flange wall 12 of the pressure receiver 6 has a deflecting portion 118 which, in the cross-sectional view, extends nearly sigmoidally from the inner peripheral edge portion of the lip portion 106 in a radially outward direction, and a flange portion 120 which further extends substantially linearly from the deflecting portion 118 along the flange wall 12 of the pressure receiver 6 in a radially outward direction. As will be seen from FIGS. 7 and 8, the flange portion 116 of the inside connecting portion 110 is connected to the flange wall 12 of the pressure receiver 6 by means of bolts 122 and nuts 124 at many positions spaced at intervals in the circumferential direction. Likewise, the flange portion 120 of the outside connecting portion 112 is connected to the flange wall 12 of the pressure receiver 6 by means of bolts 126 and nuts 128 at many positions spaced at intervals in the circumferential direction. In this way, the partitioning means 14 is mounted on one surface of the flange wall 12 of the pressure receiver 6. The lip portion 106 of such partitioning means 14 can be displaced by a relatively small force toward and away from the surface 4 (in the right-and-left direction in FIGS. 7 and 8) to which the device 2 is allowed to suction-adhere, because of the elastic deformation of the deflecting portion 114 of the inside connecting portion 110 and the deflecting portion 118 of the outside connecting portion 112. As will be understood from FIG. 3 together with FIGS. 7 and 8, the pressure reduction space 16 is defined by the inside connecting portion 110 of the partitioning means 14 in cooperation with the pressure receiver 6 and the surface 4.

Figure 7:
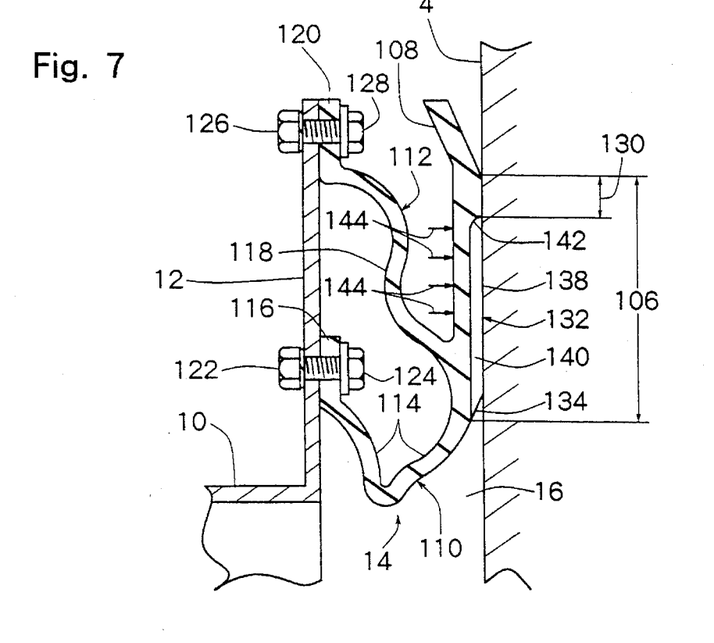
FIG. 7 is a sectional view taken on line 7—7 of FIG. 5.
Figure 8:
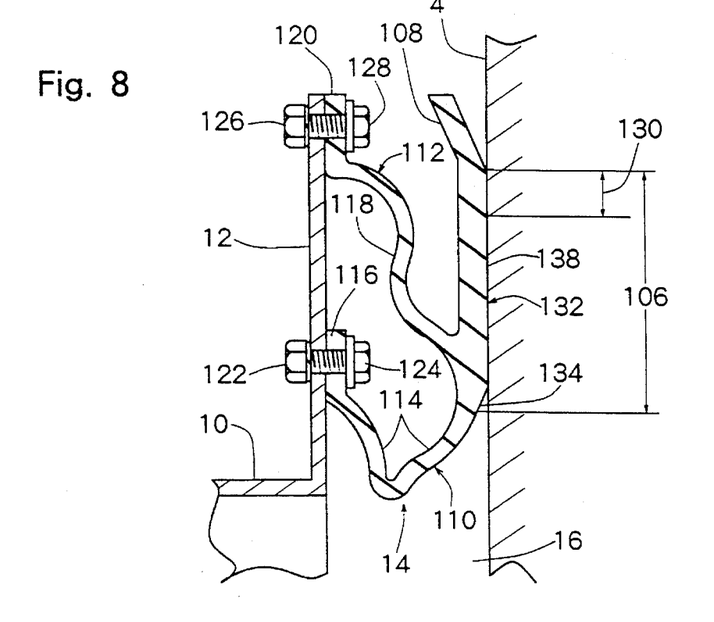
FIG. 8 is a sectional view taken on line 8—8 of FIG. 5.

Further referring to FIGS. 4 to 8, it is important that on that opposing face of the lip portion 106 of the partitioning means 14 (the right side surface in FIGS. 7 and 8) which is located opposite to the surface 4, a plurality of contacting means be disposed at intervals at a part other than an outer peripheral edge portion 130 of the lip portion 106. The contacting means in the illustrated embodiment are composed of ridges 132 extending radially at intervals in the circumferential direction at the part other than the outer peripheral edge portion 130 in the opposing face of the lip portion 106. Each ridge 132 extends radially inwardly to an inner peripheral edge of the opposing face of the lip portion 106. As will be understood from FIG. 7, it is preferred that the radially inside end portion of each ridge 132 be provided with an inclined surface 134 inclined radially inwardly in a direction away from the surface 4 (in a downwardly leftward direction in FIG. 7). As clearly shown in FIG. 6, it is also preferred that the circumferentially opposite side surfaces of each ridge 132 be formed as inclined surfaces 136 inclined toward the circumferentially opposite sides thereof in a direction away from the surface 4. As clearly illustrated in FIG. 8, a substantially flat front end surface 138 of the ridge 132 (the right edge in FIGS. 7 and 8) is on substantially the same plane as the outer peripheral edge portion 130 in the opposing face of the lip portion 106. Hence, as clearly shown in FIG. 7, a plurality of grooves located between the adjacent ridges 132 are formed at the part other than the outer peripheral edge portion 130 in the opposing face of the lip portion 106. Each of these grooves extends radially to the inner peripheral edge of the opposing face of the lip portion 106. Thus, in a state in which the outer peripheral edge portion 130 in the opposing face of the lip portion 106 is brought into contact with the surface 4, and at the same time, the front end surface 138 of the ridge 132 is contacted with the surface 4, a gap 140 is retained between the surface 4 and the part other than the outer peripheral edge portion 130 of the lip portion 106 owing to the presence of the grooves. Such a gap 140 communicates with the pressure reduction space 16. As shown in FIG. 7, it is advantageous that the radially outside end wall of the groove (accordingly, the radially inside end surface of the outer peripheral edge portion 130) be also defined by an inclined surface 142 inclined radially inwardly in a direction away from the surface.

The above-described device 2 is used in the air (or in a liquid), and as illustrated in FIG. 3, is situated such that the opposing face of the lip portion 106 of the partitioning means 14 is located opposite to the surface 4, while the outer peripheral edge portion 130 in the opposing face of the lip portion 106 and the front end surface 138 of the ridge 132 are brought into contact with the surface 4. Then, the pressure reducing means 24 is actuated to decrease the pressure within the pressure reduction space 16. The lip portion 106 of the partitioning means 14 is displaceable by a relatively small force toward and away from the surface 4 because of the elastic deformation of the deflecting portion 114 of the inside connecting portion 110 and the deflecting portion 118 of the outside connecting portion 112. Therefore, the pressure of an ambient fluid acting on the pressure receiver 6 owing to the difference in pressure between the inside and outside of the pressure reduction space 16 is transmitted mainly to the surface 4 via the wheels 54, 58, 82 and 86 mounted on the pressure receiver 6 via the rigid frame structure comprising the connecting frames 26 and 28, transverse frames 38 and 42, and traveling frames 46 and 48, whereby the device 2 is caused to suction-adhere to the surface 4. When the wheels 54, 58, 82 and 84 are rotationally driven, the device 2 is moved along the surface 4. When the wheels 54 and 58 and the wheels 82 and 86 are rotated in the same direction, the device 2 is moved straight upward or downward in FIG. 1; whereas when the wheels 54 and 58 and the wheels 82 and 86 are rotated in opposite directions to each other, the device 2 is turned clockwise or counterclockwise in FIG. 1. The device 2 is equipped with a suitable working means (not shown) such as a shot blast cleaning means, and during its movement along the surface 4, desired work is performed for the surface 4 by the working means.

Figure 9:
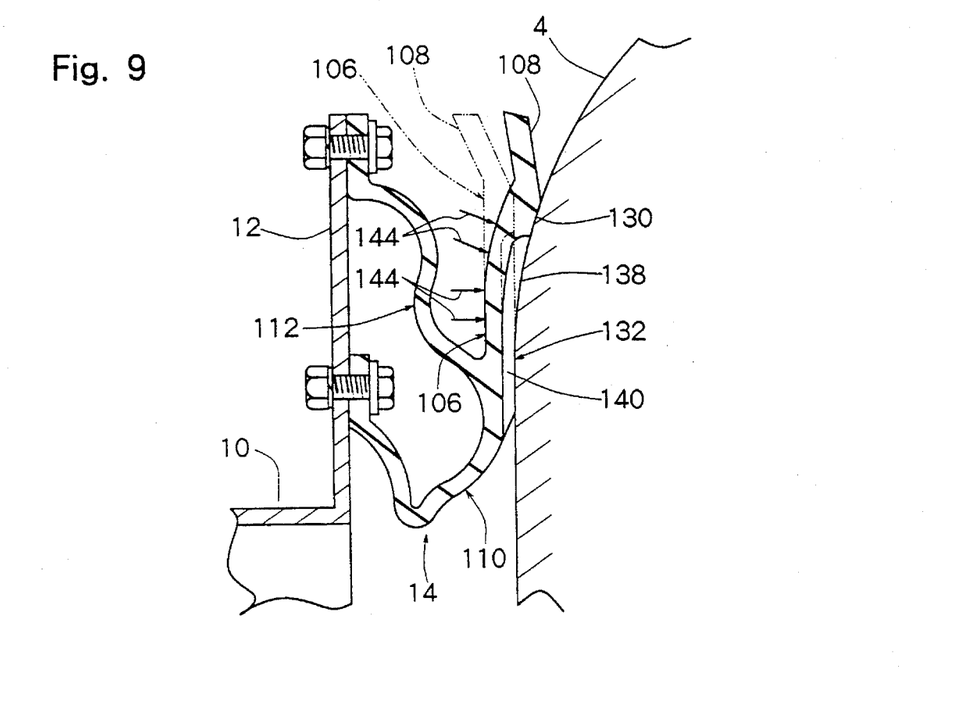
FIG. 9 is a sectional view similar to FIG. 7 for illustrating the action of the partitioning means shown in FIG. 4.

In the illustrated device 2 constructed in accordance with the present invention, the ridges 132 are formed at the part other than the outer peripheral edge portion 130 in that opposing face of the lip portion 106 of the partitioning means 14 which is located opposite to the surface 4, and the gap 140 is retained between the surface 4 and the part other than the outer peripheral edge portion 130 in the opposing face of the lip portion 106. Thus, the separation of the lip portion 106 of the partitioning means 14 from the surface 4 is reliably prevented, and the outer peripheral edge portion 130 in the opposing face of the lip portion 106 and the front end surface 138 of the ridge 132 are stably kept in contact with the surface 4. This point will be described in further detail. As illustrated in FIG. 7, the gap 140 is retained between the surface 4 and the part other than the outer peripheral edge portion 130 in the opposing face of the lip portion 106, and this gap 140 is allowed to communicate with the pressure reduction space 16. As a result, the pressure within the gap 140 is also decreased. Hence, the pressure of the ambient fluid as indicated by arrows 144 acts on the lip portion 106, whereby the lip portion 106 is pressed against the surface 4. If the gap 140 is not present and the pressure of the ambient fluid as indicated by arrows 144 does not work, the following problem is likely to occur: When the surface 4 is a curved surface with a relatively small radius of curvature as illustrated by a two-dot chain line in FIG. 9, the lip portion 106 of the partitioning means 14 does not bend along the curved surface 4, but continues to extend in a planar form, owing to the rigidity the lip 106 itself has. Because of this, the lip 106 separates from the surface 4, destroying the fluid-tight state of the pressure reduction space 16. On the other hand, when the pressure of the ambient fluid as indicated by arrows 144 acts on the lip portion 106 because of the presence of the gap 140, the lip portion 106 is pressed against the surface 4 by the pressure of the ambient fluid as indicated by a solid line in FIG. 9, whereby the lip portion 106 is bent in correspondence with the curvature of the surface 4. Thus, the outer peripheral edge portion 130 in the opposing face of the lip portion 106 and the front end surface 138 of the ridge 132 are kept in full intimate contact with the surface 4. Even if there is a bulge on the surface 4 due to a weld line or the like, the lip portion 106 can fully easily pass over the bulge and proceeds, thanks to the guiding action of the extension 108 which extends from the front end of the lip portion 106 while inclining in a direction away from the surface 4. The aforementioned inclined surfaces 134, 136 and 142 formed in connection with the ridge 132 formed in the opposing face of the lip portion 106 and the grooves defining the gap 140 also make it easy for the lip portion 106 to pass over the bulge.

Figure 10:
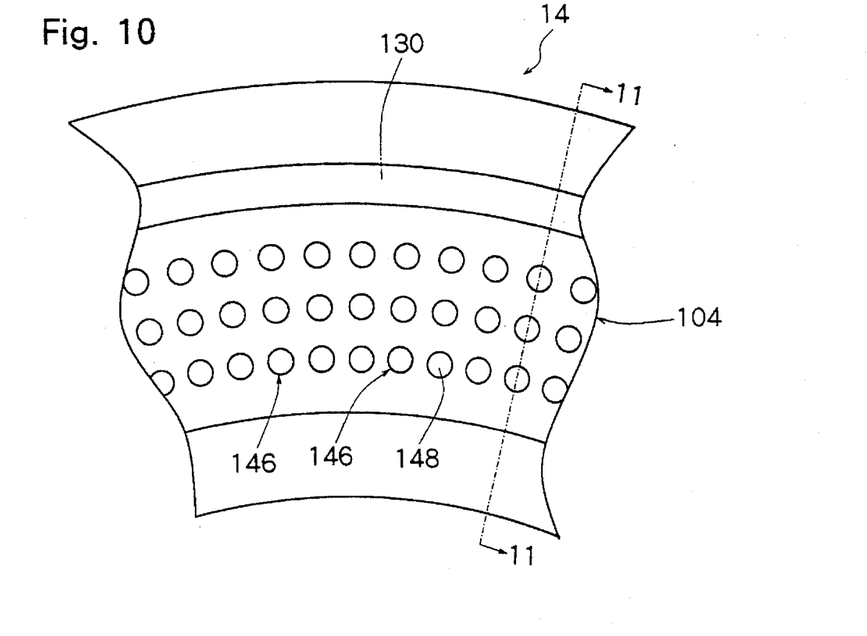
FIG. 10 is a bottom view similar to FIG. 4 showing a modified example, partly enlarged, of the partitioning means.
Figure 11:
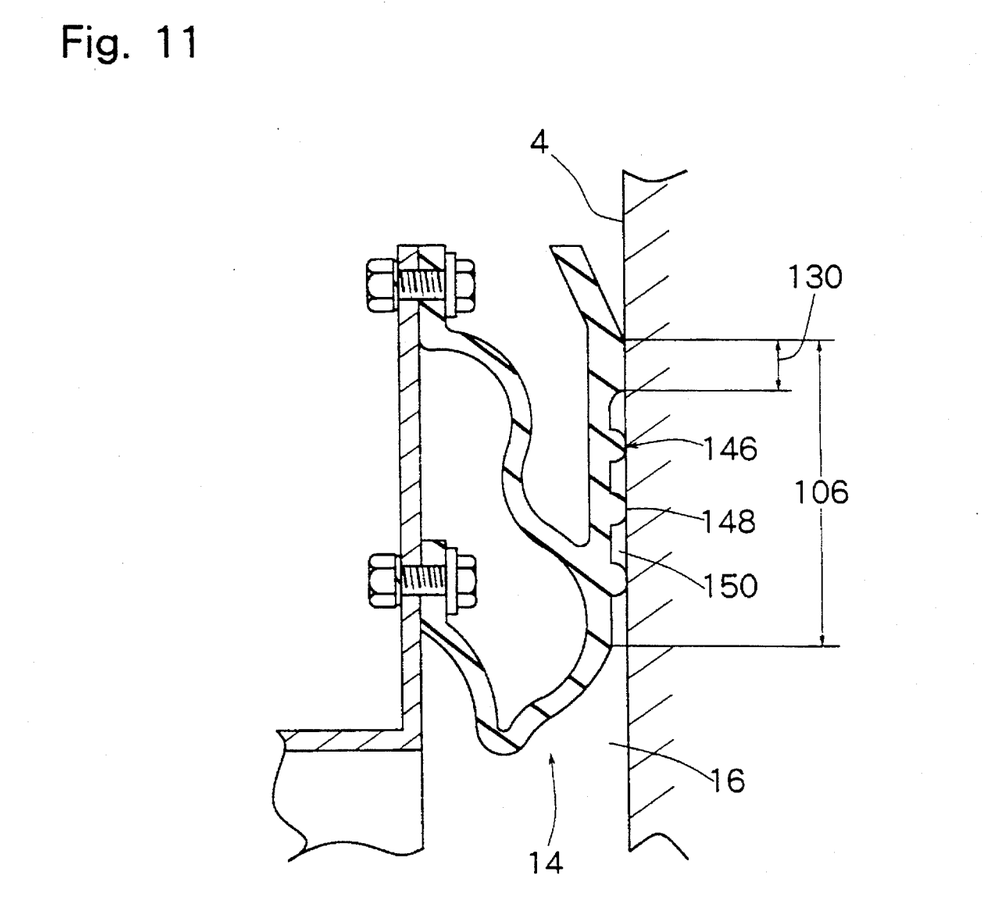
FIG. 11 is a sectional view taken on line 11—11 of FIG. 10.

FIGS. 10 and 11 show a modified example of a plurality of contacting means formed at intervals at the part other than the outer peripheral edge portion 130 in that opposing face of the lip portion 106 of the partitioning means 14 which is located opposite to the surface 4. In this modified example, a multiplicity of columnar projections 146 are formed at suitable intervals at a part other than an outer peripheral edge portion 130 in the opposing face of the lip portion 106. Each of the projections 146 constitutes the contacting means. The peripheral side surface tip portion of each projection 146 is advantageously tapered off toward its tip, as illustrated in FIG. 11. The front end surface of each projection 146 is substantially flat, and is substantially on the same plane as the outer peripheral edge portion 130 in the opposing face of the lip portion 106. As clearly shown in FIG. 11, in a state in which the front end surface 148 of the projection 146 as well as the outer peripheral edge portion 130 in the opposing face of the lip portion 106 is contacted with the surface 4, a gap 150 is retained between the surface 4 and the part other than the outer peripheral edge portion 130 in the opposing face of the lip portion 106, and this gap 150 is allowed to communicate with the pressure reduction space 16. The structure other than the projections 146 constituting the contacting means in the partitioning means 14 illustrated in FIGS. 10 and 11 is substantially the same as the structure of the partitioning means 14 that has been explained in detail with reference to FIGS. 4 to 9.

Figure 12:
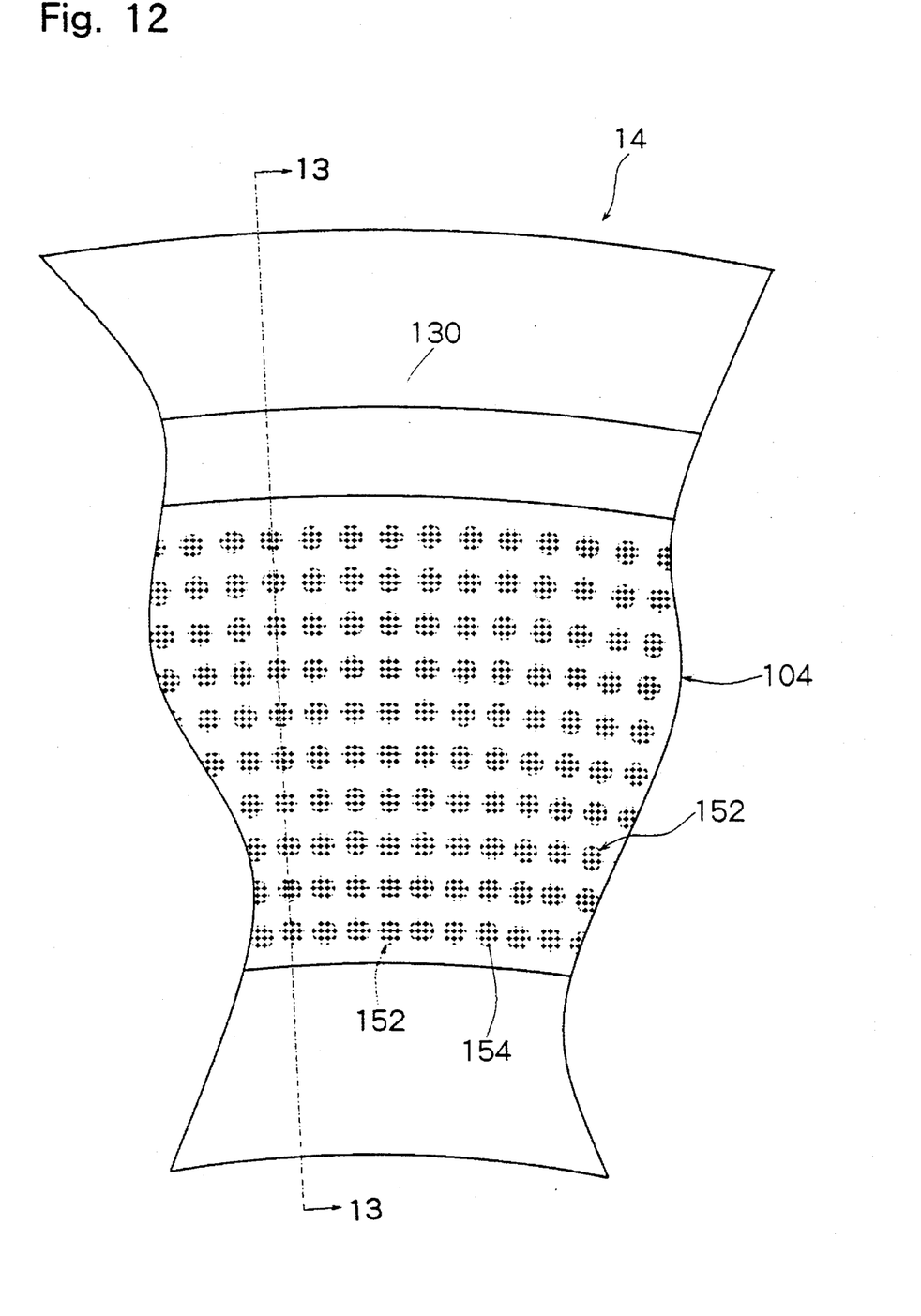
FIG. 12 is a bottom view similar to FIG. 4 showing another modified example, partly enlarged, of the partitioning means.
Figure 13:
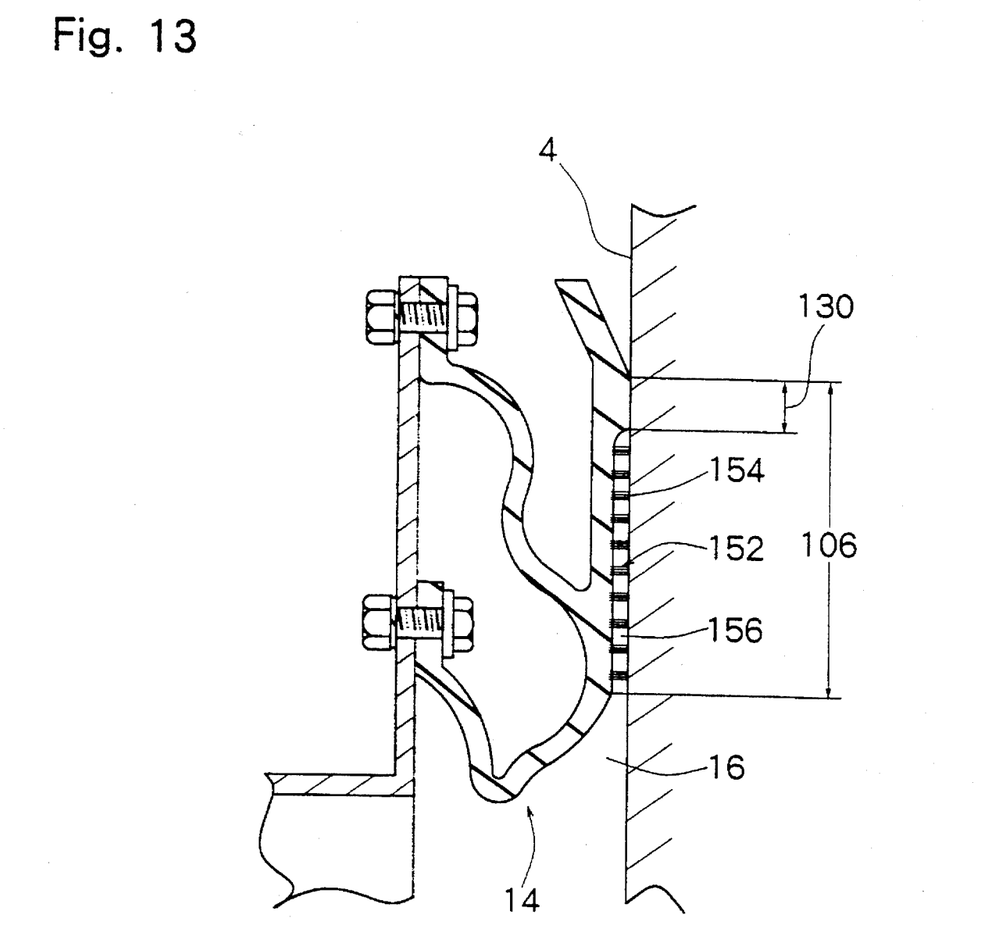
FIG. 13 is a sectional view taken on line 13—13 of FIG. 12.

FIGS. 12 and 13 show another modified example of a plurality of contacting means formed at intervals at a part other than an outer peripheral edge portion 130 in that opposing face of the lip portion 106 of the partitioning means 14 which is located opposite to the surface 4. In this modified example, a multiplicity of brushes 152 are embedded at suitable intervals in the part other than the outer peripheral edge portion 130 in the opposing face of the lip portion 106. Each of the brushes 152 is formed of a plurality of hairy bodies. The hairy body may be composed of synthetic resin, a metal or a natural hair. As illustrated in FIG. 13, the front end 154 of the brush 152 is substantially on the same plane as the outer peripheral edge portion 130 in the opposing face of the lip portion 106. In a state in which the front end surface 154 of the brush 152 as well as the outer peripheral edge portion 130 in the opposing face of the lip portion 106 is contacted with the surface 4, a gap 156 is retained between the surface 4 and the part other than the outer peripheral edge portion 130 in the opposing face of the lip portion 106, and this gap 156 is allowed to communicate with the pressure reduction space 16. The structure other than the brushes constituting the contacting means in the partitioning means 14 illustrated in FIGS. 12 and 13 is substantially the same as the structure of the partitioning means 14 that has been explained in detail with reference to FIGS. 4 to 9.

If desired, it is further possible to markedly increase the surface roughness of the part other than the outer peripheral edge portion 130 in that opposing face of the lip portion 106 of the partitioning means 14 which is located opposite to the surface 4, thereby forming a multiplicity of irregularities so that the many convexities will constitute the contacting means and the many concavities will constitute the retained gap.

While the present invention has been described in detail hereinabove by reference to some specific embodiments taken in conjunction with the accompanying drawings, it should be understood that the invention is not limited to these embodiments, but various changes and modifications are possible without departing from the scope of the invention.

I claim:

1. A device capable of suction-adhering to a surface and moving therealong, comprising:

a pressure receiver, a partitioning means mounted on the pressure receiver and defining a pressure reduction space in cooperation with the pressure receiver and the surface, wherein the partitioning means includes a lip portion which extends along the surface, and wherein the lip portion is displaceable by a relatively small force toward and away from the surface, and a pressure reducing means for discharging a fluid from the pressure reduction space to decrease a pressure inside the pressure reduction space, wherein the lip portion has a first part and a second part, the first part of the lip portion having a plurality of contacting means disposed at intervals thereon, and a plurality of gaps located between the contacting means and in communication with the pressure reduction space, the second part of the lip portion providing an outer peripheral edge portion thereof, whereby, when the device is suction-adhered to the surface, the outer peripheral edge portion of the lip portion and the contacting means are brought into contact with the surface, and the outer peripheral edge portion maintains the pressure reduction space and the gaps fluid-tight.

2. The device of claim 1, wherein the outer peripheral edge portion and a front end of the contacting means of the lip portion are substantially on a common plane.

3. The device of claim 1 or 2, wherein the lip portion is annular in shape, and each of the contacting means is composed of a ridge extending radially over the first part of the lip portion.

4. The device of claim 1 or 2, wherein each of the contacting means is composed of a columnar projection.

5. The device of claim 1 or 2, wherein each of the contacting means is composed of a brush embedded in the first part of the lip portion.

6. The device of claim 1, wherein the partitioning means includes an extension which extends obliquely from a front end of the lip portion in a direction away from the surface.

7. The device of claim 1, wherein the partitioning means includes an inside connecting portion and an outside connecting portion connecting an inner peripheral edge of the lip portion to the pressure receiver, and wherein the lip portion, the inside connecting portion and the outside connecting portion of the partitioning means are formed of a flexible material so that the lip portion is displaced toward and away from the surface by elastic deformation of the inside connecting portion and the outside connection portion.

8. The device of claim 1, wherein the partitioning means includes:

an extension which extends obliquely from a front end of the lip portion in a direction away from the surface, and an inside connecting portion and an outside connecting portion connecting an inner peripheral edge of the lip portion to the pressure receiver, and wherein the lip portion, the extension, the inside connecting portion and the outside connecting portion of the partitioning means are integrally formed of a flexible material so that the lip portion is displaced toward and away from the surface by elastic deformation of the inside connecting portion and the outside connection portion.

* * * * *